United States Patent [19]

Brobeck

[11] 4,424,003
[45] Jan. 3, 1984

[54] IMPROVED CONNECTION STRUCTURE FOR JOINING CERAMIC AND METALLIC PARTS OF A TURBINE SHAFT

[75] Inventor: Helmut Brobeck, Hessheim, Fed. Rep. of Germany

[73] Assignee: AG Kühnle, Kopp & Kausch, Frankenthal, Fed. Rep. of Germany

[21] Appl. No.: 231,753

[22] Filed: Feb. 5, 1981

Related U.S. Application Data

[63] Continuation of Ser. No. 913,494, Jun. 7, 1978, abandoned.

[30] Foreign Application Priority Data

Jun. 27, 1977 [DE] Fed. Rep. of Germany ....... 2728823

[51] Int. Cl.³ ............................ F01D 5/28; F01D 5/34
[52] U.S. Cl. ............................ 416/241 B; 416/244 A; 415/214
[58] Field of Search ....................... 416/244 A, 241 B; 415/214

[56] References Cited

U.S. PATENT DOCUMENTS

| | | | |
|---|---|---|---|
| 3,612,628 | 10/1971 | Steele | 416/241 B X |
| 3,715,176 | 2/1973 | Kerklo | 416/244 A X |
| 3,801,226 | 4/1974 | Bevan et al. | 416/241 B |
| 3,829,722 | 8/1974 | Rosenthal, Jr. et al. | 416/244 X |
| 3,865,497 | 2/1975 | Bratt et al. | 416/244 X |
| 4,011,737 | 3/1977 | Kruger et al. | 416/244 A X |
| 4,063,850 | 12/1977 | Hueber et al. | 416/244 A X |
| 4,123,199 | 10/1978 | Shimizu et al. | 416/244 A |
| 4,125,344 | 11/1978 | Tiefenbacher | 416/241 B X |
| 4,176,519 | 12/1979 | Kronogard | 416/241 B X |

FOREIGN PATENT DOCUMENTS

| | | | |
|---|---|---|---|
| 735504 | 5/1943 | Fed. Rep. of Germany | 416/241 B |
| 578533 | 7/1946 | United Kingdom | 416/244 |

Primary Examiner—Stephen Marcus
Assistant Examiner—Joseph M Pitko
Attorney, Agent, or Firm—Cushman, Darby & Cushman

[57] ABSTRACT

The invention relates to turbine wheels and in particular an improved way to form the connection between non-metallic turbine wheels and a metallic shaft. The resulting structure provides a secure connection therebetween, reduces tension loads otherwise placed on the non-metallic turbine wheel allowing higher rotational speeds and provides bearing and sealing areas.

13 Claims, 7 Drawing Figures

Fig. 4
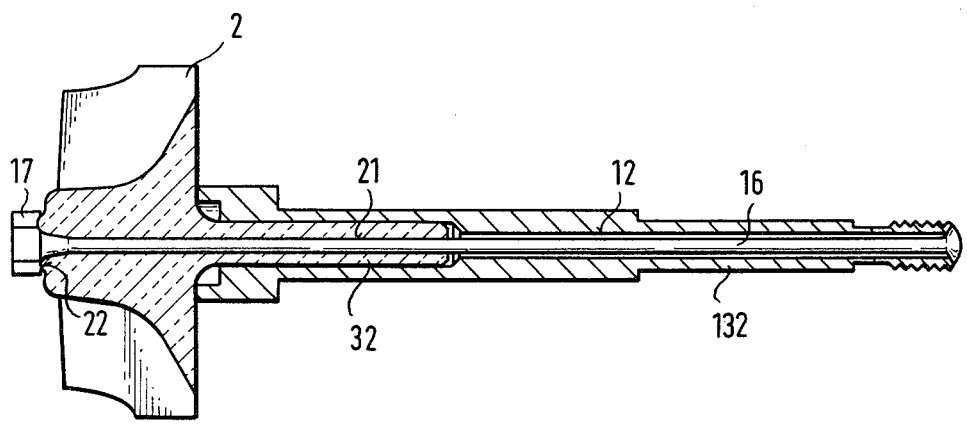
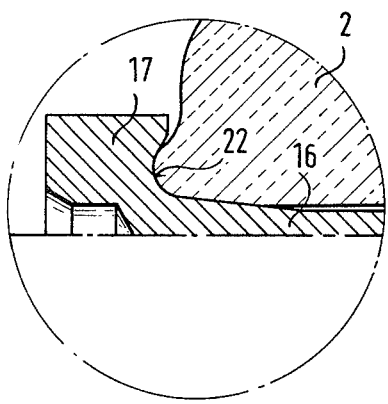
Fig. 5
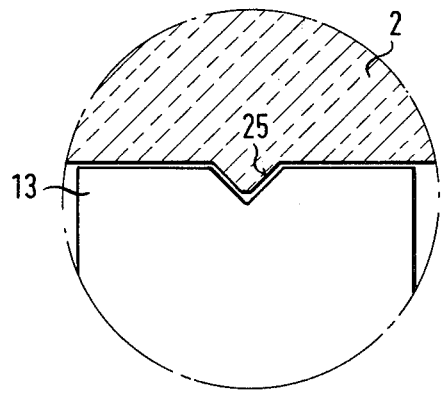
Fig. 6

IMPROVED CONNECTION STRUCTURE FOR JOINING CERAMIC AND METALLIC PARTS OF A TURBINE SHAFT

This is a continuation, of application Ser. No. 913,494 filed June 7, 1978, now abandoned.

The invention concerns a gas turbine, especially an exhaust gas turbosupercharger, with a turbine wheel and a shaft of a heat-resistant as well as non-metallic material, especially ceramic.

It is known that turbine wheels and shafts can be manufactured out of a ceramic material (DT-OS 25 27 498). In this case, the turbine wheel itself, however, consists of two ceramic parts which are connected together by sintering. In those instances where the manufacture of the turbine shaft is entirely of ceramic material, it is essential that the external outline thereof be provided with whatever shaped elements are needed for turbine shaft sealing and bearing purposes (i.e. the external outline of the ceramic turbine shaft is provided with shoulders, recessed grooves and planar bearing surfaces). These sudden changes in cross section serve to place rotating speed limits on the gas turbine structure. As a result the turbine structure can be driven only at relatively low rotational speeds, since a breaking of the turbine shaft is unavoidable at high rotational speeds.

In gas turbines employing a turbine rotor journaled at two sides, it is already known to produce the turbine rotor and the bearings at both sides out of a ceramic material, wherein the compressor is connected with the turbine rotor through a plug sleeve transmitting the turning moment (DI-OS 25 10 287). The metal-ceramic connection arising in that case lies already on the relatively cold side. The danger which exists, however, is that the stepped end of the ceramic shaft at the abutment location of metal and ceramic breaks in this region at high rotational speeds due to the notch effect and the different temperature conductivities of the two materials.

It is also known to manufacture the turbine wheel and a short shaft stub of a ceramic material and to provide them with a co-axial bore, through which the metallic turbine shaft is plugged (DT-OS 25 14 699). With the aid of a clamping nut screwed onto the shaft protruding at the front side of the wheel, the ceramic turbine wheel is fastened to the metal shaft with this fastening point serving also as the torque transmission point. If the turbine shaft supporting the turbine wheel is to fulfil the function ascribed to it, it must be resistant to bending. Since shafts of metallic material display a strong falling-off of the modulus of elasticity under increasing temperature conditions, the shaft must be made relatively thick in order to compensate the loss in bending resistance when used under high temperature conditions. This however leads to such large bores in the turbine wheel that the wheel can no longer withstand the tension stresses at the hole edges arising at high temperatures and high peripheral speeds due to the relatively slight hub volume available. It is very difficult at the same time to fulfil the problem of the mounting, sintering and transmitting turning moment or torque when the turbine wheel and the turbine shaft combine use of materials with different physical manners of behavior, for example with different thermal expansion co-efficients and different brittleness. Further, those difficulties are not lessened when the connecting location is moved from a hot zone into the cold zone.

All these known solutions for the connection of ceramic wheels with shafts or shaft parts do not sufficiently consider the specific low tension and torsion resistance of ceramic materials. Tension stresses arise, as already mentioned, at the hole edge of the turbine wheel's central bore in the shape of tangential tension stresses which become greater with increasing hole diameter. For this reason, a highly stressed turbine wheel can be equipped only with a very narrow central bore.

The use of plate springs has been suggested but these cannot fulfil the desired effect, namely to compensate for thermal expansion, since they become annealed at the high operating temperatures of gas turbines and thereby lose their spring properties.

The use of ceramic turbine wheels is of particular advantage in the operation of gas turbines, especially in exhaust gas turbo-superchargers, because turbine wheels are not only very much lighter because of the ceramic material and have a lower mass inertia, (i.e. can be accelerated more rapidly), but also exhibit a greater heat resistance, which affords the possibility that gas turbines can be operated at higher temperatures and thereby at a higher efficiency.

Accordingly, it is highly desirable to be able to overcome the previous difficulties arising at the connecting location between ceramic and metallic parts.

The invention, therefore, deals with the structure of the connection between the non-metallic turbine wheel and the metallic shaft. It is important that this connection be made in such a manner that no or only very small tension loads caused by the connection, be created in the non-metallic turbine wheel while simultaneously assuring a secure connection which can be simply manufactured.

This problem is solved according to the present invention whereby the non-metallic shaft is lined with a metallic hollow shaft, that extends over the entire length of the non-metallic shaft. Further, the external outline of the hollow shaft carries or is formed into shaped elements for sealing and bearing purposes. Additionally, the non-metallic shaft preferably has a length of at least three times its largest diameter.

The difficulties which have hitherto resulted when using non-metallic turbine wheels in gas turbines are overcome in an advantageous manner through a construction as described herein. The connection created between the non-metallic turbine wheel and its non-metallic shaft together with a metallic shaft part as described herein assures that no tension stresses arise to endanger the ceramic parts even at very high rotational speeds and very high temperature loadings. The hollow metallic shaft is applied over the non-metallic shaft so that it extends up the wheels's rear side in a region beyond the transition from the wheel's rear side to the non-metallic shaft. Through this construction it is possible to provide for both sealing and bearing areas so that no new problems result from this side.

There are a number of possible ways to make the connection between the non-metallic shaft and the hollow shaft which particularly include making the connection by shrunk fit, press fit, conical fit, glueing or casting over.

It is envisaged as a measure for the refinement of the invention, that the non-metallic shaft displays a constant or continuously changing cross section which is followed by the shape of the internal bore of the hollow shaft. With this kind of the shaping of the non-metallic shaft, notching stresses are avoided, to which the ceramic reacts particularly sensitively. Thereby, a shrunk fit or a press fit or conical fit lets itself be realized very simply. In that case, only pressure stresses are effected where the metal is in contact with the non-metallic shaft so that the non-metallic part of the turbine shaft altogether contributes to the increase of the bending resistance of the turbine shaft.

According to a further refinement of the invention, a tie rod, which extends through the hollow shaft is anchored to the hollow shaft at the end thereof lying opposite the turbine wheel, is fastened in the non-metallic shaft.

Through such a tie rod, a pre-stressing force is built up, which holds the non-metallic shaft and the hollow shaft in a friction-locking connection in every operational state. For this purpose, the temperature-dependent expansion of the hollow chart is so chosen that it increases the tension stress on the tie rod at the operational temperature. The compressive stress introduced into the non-metallic shaft by the hollow shaft in consequence of the press or shrunk fit is in that case expediently chosen to be so high that the tension stresses are compensated, which arise over the splice length of the tie rod on the later application of the tension force.

According to a further refinement, the turbine wheel and the non-metallic shaft can be provided with a co-axial bore, which is of smaller diameter and through which runs a tie rod which is fastened to the hollow shaft end lying opposite the turbine wheel and which by its head lies snugly against an encircling rounding at the front side of the hub of the turbine wheel. Since no bending resistance is required for the tie rod, it can have a small diameter with appropriate choice of material so that only a very small diameter bore in the hub of the turbine wheel and the non-metallic shaft is required. With the aid of this tie rod, an axial compressive force also lets itself be exerted on the ceramic part, and namely also with negative thermal expansion co-efficient of the tie rod, whereby one can attain that even at very extreme operating conditions, tension stresses which certainly do not arise in the non-metallic shaft as in the transition region between shaft and wheel, i.e. this transition region is believed of bending moments.

In a special refinement of the invention, the co-axial bore in the opening region towards the encircling rounding has a slight conical enlargement, and there is a corresponding conical thickening of the tie rod in the transition region to the head. This refinement contributes to the improvement of the sintering, which remains maintained also with changing temperatures, when the co-efficients of expansion of the different materials are appropriately matched to one another. Since the hub also widens due to centrifugal force loading, by appropriate choice of material for the tie rod, the expansion thereof lets itself be adapted particularly well through its construction to the expansion of the hub.

Still another refinement of the invention is in the form of a centering aid comprising a radially arranged, shape-locking tooth device, preferably a groove and key spline, arranged between the wheel rear side of the hub of the turbine wheel and the end face of the hollow shaft.

These and other advantages and features of the invention will be evident from the following description in connection with the drawings as follows:

FIG. 4 shows still another embodiment of the turbine wheel according to the present invention together with a continuous tie rod;

FIG. 5 shows an enlarged sectional view of the head of the tie rod as shown in FIG. 4;

FIG. 6 shows an enlarged sectional view along lines 6—6 of FIG. 2 showing the centering air at the end face of the hollow shaft.

Figure 1:
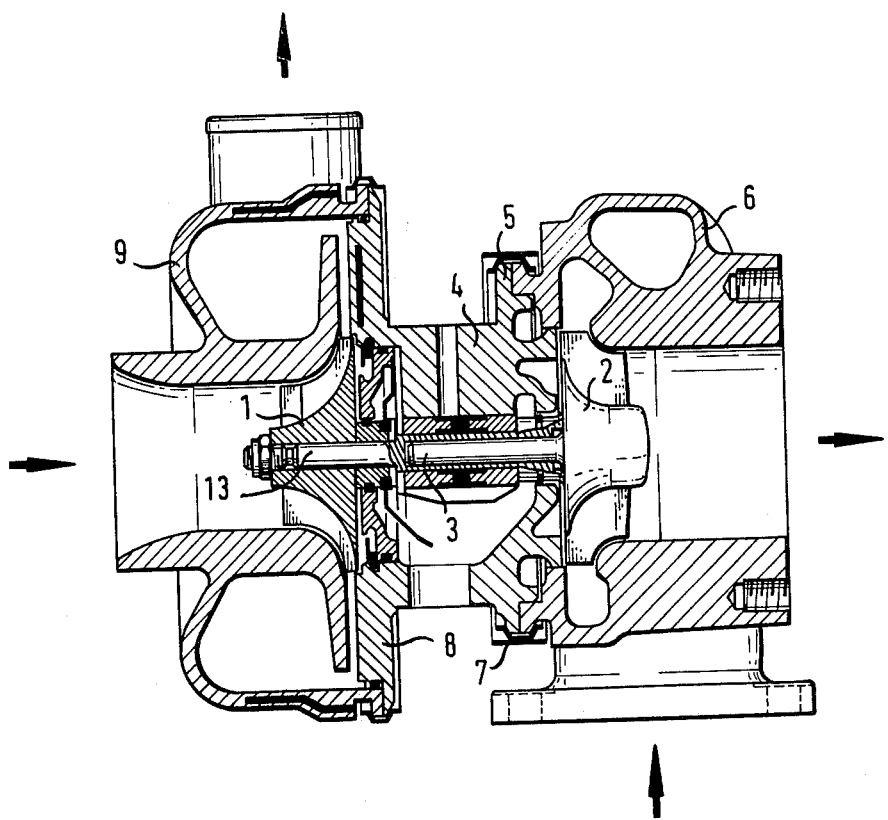
FIG. 1 shows a schematic front elevation view in partial section of an exhaust gas turbosupercharger and turbine wheel and a part of the turbine shaft of a non-metallic material.

Turning to the drawings, FIG. 1 shows an exhaust gas turbosupercharger, in which a compressor wheel 1 and a turbine wheel 2 are fastened to a common shaft. This common shaft consists of a non-metallic shaft 3 integrally connected with the turbine wheel 2 and a metallic hollow shaft 13, which is securely connected to the non-metallic shaft and which carries the compressor wheel 1. The turbine shaft is journalled in conventional manner in a bearing housing 4, which on the turbine side is connected through a flange-like collar 5 to the turbine housing 6 by a clamping ring 7. On the compressor side, the bearing housing 4 is provided with a disc-shaped flange 8, to which the housing cowl 9 is likewise fastened by a clamping ring.

The turbine wheel 2 and the non-metallic shaft 3 in the shape of a shaft spigot both consist of the same or a similar non-metallic material, such as ceramic. In production, the shaft spigot and the turbine wheel can at first be manufactured separately and plugged into each other before sintering. During the subsequent sintering process, the two parts connect practically into one non-detachable integral part. This assures that the shaft spigot and the turbine wheel are manufactured from a ceramic material in a manner which permits the optimum adaptation to operation conditions. If one provides such materials, which have a like or at least as close a thermal co-efficient of expansion as is possible, then it is possible to use a ceramic material for the shaft spigot of higher elasticity by comparison with the turbine wheel, whereby the capability of resistance of the shaft spigot to bending loads can be increased. Independently of the possibility of the multi-part manufacture of the non-metallic turbine wheel and the non-metallic shaft spigot, it is presupposed for the following description that the shaft spigot and the turbine wheel are an integral part.

Figure 2:
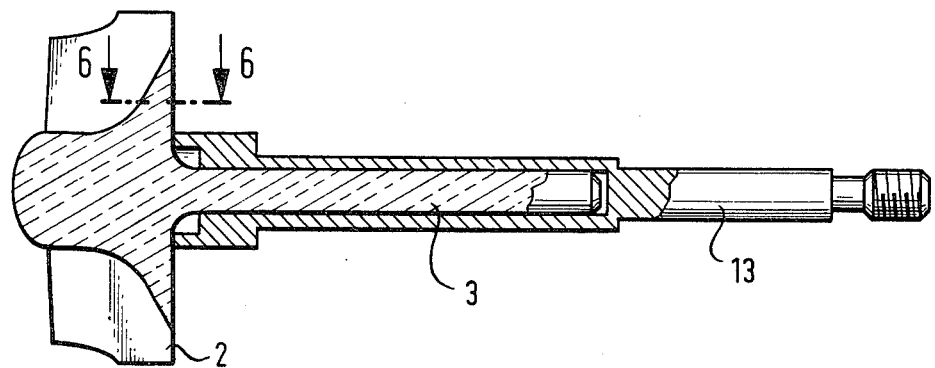
FIG. 2 shows an enlarged partial sectional view of the turbine wheel, according to the invention, with its non-metalic shaft inserted into a hollow metallic shaft.

The hollow metallic shaft 13 in the embodiment shown in FIG. 2 is comprised of a solid section, which carries the compressor wheel 1, and a hollow sleeve-shaped section, which runs in the region of the bearing housing 4. The external outline of the metallic hollow shaft 13 is provided with all shaped elements which are required for sealing and bearing purposes, wherein these shaped elements are made in a conventional manner and are, therefore, not explained and shown in detail in the illustration.

The internal dimensions of the sleeve-shaped part of the hollow shaft 13 are matched to the dimensions of the shaft spigot 3. In that case, it is to be presupposed that the non-metallic shaft spigot 3 displays a length of at least three times the diameter of the shaft spigot. The course of the outline of the internal bore of the hollow shaft is as far as possible matched to the course of the outline of the shaft spigot as shown in FIG. 2. Further, the internal bore of the hollow section of shaft 13 is smooth and has either a constant cross section or a slightly conically tapering cross section. With such a slightly conically tapering cross section, the angles of inclination of the shaft spigot 3 and of the internal bore of the hollow shaft 13 can be slightly different. A construction of that kind is particularly advantageous when the connection between the non-metallic shaft spigot 3 and the metallic hollow shaft 13 is produced by a shrunk fit or a press fit procedure, for which the shaft spigot 3 non-releasably connects with the hollow shaft 13 substantially over the entire length of the shaft spigot 3. The slightly conical course of the cooperating surfaces, either with the same or a slightly different angle of inclination, can prove to be particularly advantageous in the interest of the control of the pressing of the shaft spigot 3 in the production of a shrunk fit for the connection of the two parts.

It is, however, also possible to construct the shaft spigot 3 and accordingly the internal bore of the hollow shaft 13 with a varying cross section, for which stepped cross-sectional regions can also be provided over compensating radii.

The hollow shaft 13 can also be glued on the non-metallic shaft spigot with the use of heat-resistant adhesive substances. However, care must be taken that the shape of the smooth surface of the shaft spigot 3 is not impaired thereby.

Regardless of the manner in which the shaft spigot 3 with the hollow shaft are connected together, care must be taken that the non-metallic material or the ceramic material is loaded only in compression, since ceramic material especially is very highly resistant to pressure, however can absorb only small tension forces.

Figure 3:
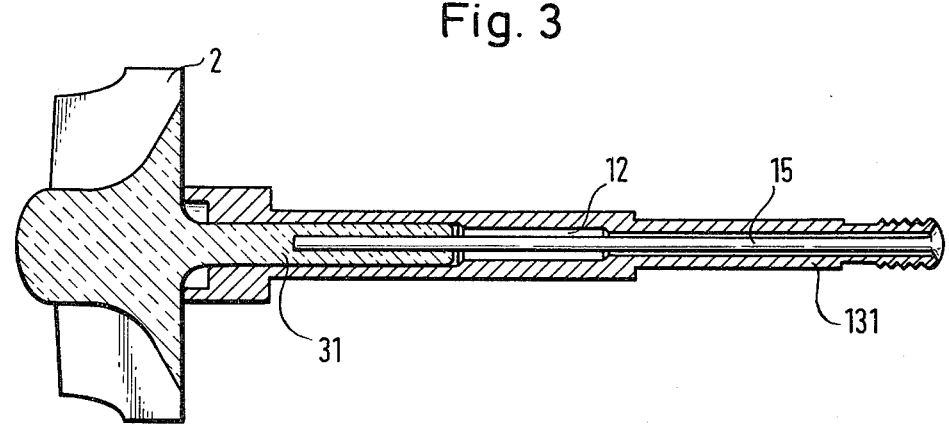
FIG. 3 shows another embodiment of the turbine wheel according to the present invention together with the use of a tie rod.
Figure 7:
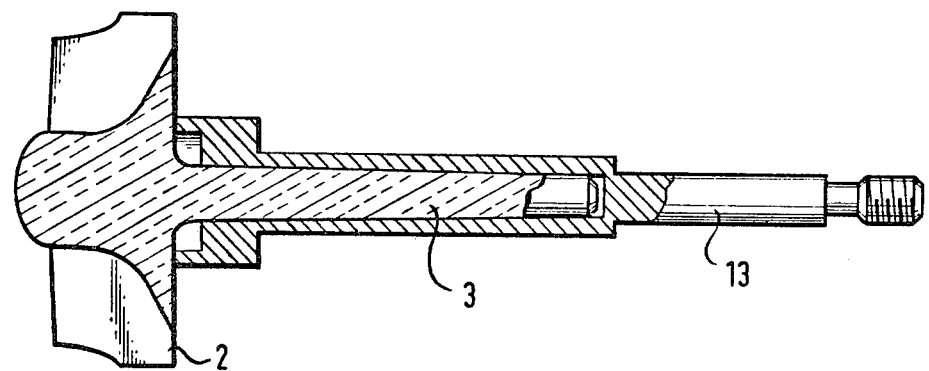
FIG. 7 is an enlarged, partial cross-sectional view according to the invention showing the non-metallic shaft as having a continuously varying cross-section and the complementary shape of the hollow metallic shaft.

The embodiment shown in FIG. 3 includes a ductile tie rod 15 which is laid into this and connected to the common shaft during the manufacture of the non-metallic shaft spigot 31. The splice length of the tie rod into the shaft spigot 31 is dimensioned according to the tension force arising in operation. The hollow metallic shaft 131 is provided with a continuous co-axial bore 12, through which the tie rod 15 runs and is fastened, preferably by welding or soldering, at the compressor side end. The non-metallic shaft spigot 31 is loaded in pressure by a press or shrunk fit in the internal bore of the hollow shaft 131 so that the tension stress arising at the operating temperatures over the splice length of the tie rod is compensated by the initiated compressive stress and the shaft spigot experiences no tension loadings.

Turning now to FIG. 4, another embodiment of a turbine wheel is shown which includes a non-metallic shaft and a hollow metallic shaft 131. The hollow shaft 132 is provided with a co-axial bore 12 and the hub of the turbine wheel 2 and the non-metallic shaft spigot 32 is provided with a central bore 21 of a relatively small diameter which extends therethrough.

The non-metallic shaft spigot 32 is held fast preferably by friction within the larger diameter internal bore of hollow shaft 132. A tie rod 16 having a head 17 at the end on the side of the turbine wheel 2 runs through the hub of the turbine wheel 2 as well as the non-metallic shaft spigot 32 and the bore 12 of the hollow shaft 132.

Tie rod 16 is connected to the turbine shaft at the end of the side of the compressor wheel by any convenient means such as welding or soldering. The head 17 of tie rod 16 lies against an encircling rounded-off portion 22 on the front side of the hub of turbine wheel 2, as shown in the enlarged view of FIG. 5. The shape of the rounded-off portion 22 is chosen so that the two parts do not obstruct each other at different radial expansion. The diameter of the tie rod gradually increases somewhat in the transition region approaching head 17 so that a conical thickening thereof occurs which fits into a corresponding conical enlargement of the central bore in the turbine wheel 2.

The differences in expansion resulting from different thermal expansion and the expansion through the loading are so matched for the hub and the tie rod that the centering remains maintained throughout the entire operating range. Through a suitable choice of material for the tie rod 16, the difference in co-efficient of expansion, compared with that of the ceramic material of the turbine wheel, will not create any disadvantageous influence, since the hub, due to the high centrifugal force loads which occur in operation, will likewise cause some expansion which adapts to the expansion of the tie rod. Through a suitable introduction of the compressive forces exerted by the tie rod 16 on the hub 2 it is possible to at least partially cancel the loading of the turbine wheel in the region of the hub bore.

Since the tie rod is constructed as a ductile element so that the loss in bending stiffness at increasing operational temperatures has no influence, the tie rod can be made with a relatively small diameter. Accordingly, only a relatively small diameter is needed for central bore 21. Correspondingly, the tension stresses arising at the hole edges of the bore 21 are also substantially reduced. Through this construction quite a significant advantage is obtained compared with known solutions (DT-OS 25 14 699), in which ceramic turbine wheels are placed on a shaft section which is resistant to bending and where this shaft must be made to be relatively thick due to the loss in bending stiffness resulting as consequence of the strongly falling modulus of elasticity at increasing temperatures, which leads to large diameter bores in the turbine wheel and therefore to high stresses at the hole edge of the central bore of the turbine.

In the embodiment according to FIG. 4, the tie rod can be stressed so far that the non-metallic shaft or the shaft spigot in the region of the internal bore of the hollow shaft is placed under compressive stress which can be chosen to be so high that no tension stresses will occur on the shaft during operation. The transition of the shaft spigot to the turbine wheel is relieved of bending moments through the support of the wheel rear side at the end face of the metallic hollow shaft. The expansion of the hollow shaft through the influence of the operating temperature is in that case designed in such a manner that the prestressing of the tie rod increases in operation in order to maintain the compressive stress of the shaft under all operational conditions. The prestressing of the tie rod in the assembly can be effected principally by a defined heating of the tie rod.

Illustrated in detail in FIG. 6 is a centering aid positioned between the wheel rear side of the hub of the turbine wheel 2 and the end face of the hollow shaft. This centering air is comprised of a radially arranged, shape-locking tooth arrangement such as, for example, a groove and key spline 25 which can be positioned at a plurality of places around the circumference of the wheel 2 and the hollow shaft.

It will now be clear that there has been provided herein a device which accomplishes the objectives heretofore set forth. While the present invention has been disclosed in its preferred form, it is to be understood that the specific embodiments thereof as described and illustrated herein should not be considered in a limited sense as there may well be other forms or modifications of the present invention which should also be construed as coming within the scope of the appended claims.

What is claimed is:

1. An improved turbine wheel structure comprised of a main non-metallic turbine wheel body, a non-metallic shaft rigidly secured to and extending away from said turbine wheel body, a metallic shaft having means defining a hollow interior bore extending inwardly from one end along at least part of the length of said metallic shaft, said non-metallic shaft having the hollow interior portion of said metallic shaft secured thereover so that said hollow interior bore extends along and in direct contact with the entire length of said non-metallic shaft, said metallic shaft having shaped sealing and bearing elements on the exterior thereof for sealing and supporting the turbine wheel.

2. A turbine wheel as in claim 1 wherein the metallic shaft has a length equal to at least three times its diameter.

3. A turbine wheel as in claim 1 wherein the non-metallic shaft has a constant varying cross section which is followed by the shape of the internal bore of the hollow metallic shaft.

4. A turbine wheel as in claim 1 wherein the non-metallic shaft has a continuously varying cross section which is followed by the shape of the internal bore of the hollow metallic shaft.

5. A turbine wheel as in claim 1 wherein at least a portion of the end of the non-metallic shaft lying opposite the turbine wheel is provided with means defining a bore extending inwardly from the end thereof and wherein the hollow portion of said metallic shaft has a length which extends beyond the length of said non-metallic shaft, said turbine wheel structure further including a tie rod secured within said bore and the extended hollow portion of said metallic shaft.

6. A turbine wheel as in claim 1 wherein the turbine wheel body, said non-metallic shaft, and said metallic shaft are provided with means defining a bore extending therethrough, said turbine wheel structure further including a tie rod fastened at one end to said metallic shaft and having a head portion at its opposite end, said head having an inner face lying against said turbine wheel body.

7. A turbine wheel as in claim 6 wherein said turbine wheel body is provided with a shaped element encircling said bore on the side opposite said non-metallic shaft and wherein the inner face of said head portion of the tie rod is shaped in a complementary fashion.

8. A turbine wheel as in claim 7 wherein the bore adjacent the shaped element and the portion of the tie rod therein are provided with a conical enlargement extending toward the head of said tie rod.

9. A turbine wheel as in claim 1 further including tooth means for locking and centering said metallic shaft with respect to said turbine wheel body.

10. A turbine wheel as in claim 9 wherein said tooth means comprises a radially arranged key spline positioned at a predetermined position on said turbine wheel body adjacent said non-metallic shaft and groove means at a predetermined point on the end of said metallic shaft positioned adjacent the turbine wheel body.

11. A turbine wheel as in claim 1 wherein said metallic and non-metallic shafts are secured together by being shrunk fit together.

12. A turbine wheel as in claim 1 whrein said metallic and non-metallic shafts are secured together by being press fit together.

13. A turbine wheel as in claim 1 wherein said metallic and non-metallic shafts are secured together by being glued together.

* * * * *